C. BULLOCK.
Harvester Cutter.

No. 18,800. Patented Dec. 8, 1857.

UNITED STATES PATENT OFFICE.

CHESTER BULLOCK, OF JAMESTOWN, NEW YORK.

IMPROVEMENT IN CUTTING APPARATUS OF MOWING-MACHINES.

Specification forming part of Letters Patent No. 18,800, dated December 8, 1857.

*To all whom it may concern:*

Be it known that I, CHESTER BULLOCK, of Jamestown, Chautauqua county, State of New York, have invented certain Improvements in the Cutting Apparatus of Mowing-Machines, which I have described in the following specification and illustrated in the accompanying drawings with sufficient clearness to enable competent and skillful workmen in the arts to which it pertains or is most nearly allied to make and use my invention.

By my improvements the cutters are made easily detachable by detaching the cutter-bar from the connecting-rod, which gives it motion, and sliding it something more than its stroke either to the right or left, so as to bring it out from under the cap or caps which hold it down at the heel of the cutters. The cutters, or the short teeth against which they cut, are, either one or both of them, so curved that the cutting-angle between them shall be the same in all parts of the stroke, or nearly so. The cutters are also so arranged that they cut fully up to the points of those teeth against which their cutting action is performed, which insures a perfect clearance of the points of those teeth at each stroke of the machine.

Figure 1:
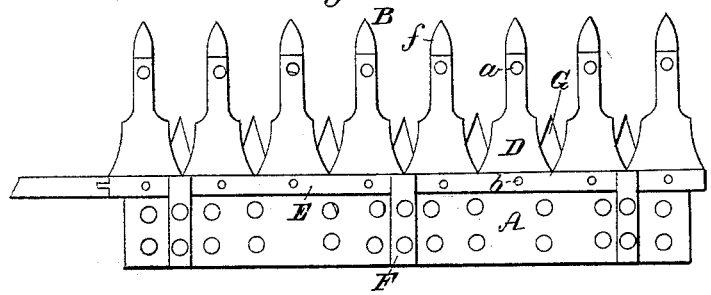
Figure 2:
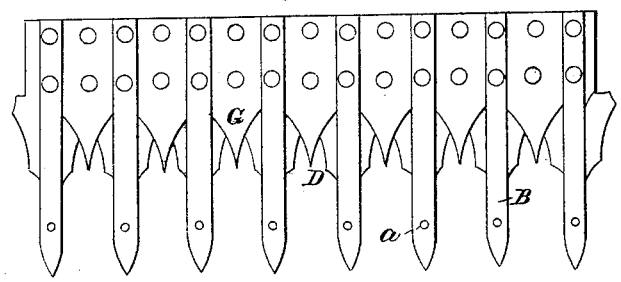
Figure 3:
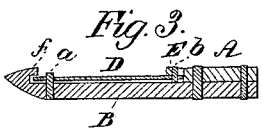

In the accompanying drawings, Figure 1 is a plan of my improved arrangement. Fig. 2 is an under side view. Fig. 3 is a sectional elevation, showing the parts at the right-hand of the center of one of the guard-fingers to which the cutters are hung.

A is the finger-bar.

B is the guard-fingers or teeth, to which the cutters D are hung by pins $a$, which are fixed in the guards B. The back ends of the cutters are hung to the under side of the cutter-bar E by a single pin, $b$, to each cutter, on which pins the cutters may vibrate freely as the machine is so operated as to cause them to do so. These pins $b$ are fixed in the cutter-bar. The cutter-bar is kept down in its place by caps F.

It is obvious that the heel of the cutters, moving, as they do, in the arc of a circle of which the pin $a$ is the center, will bring the cutter-bar slightly forward at the completion of each stroke or vibration, but not enough to bring it out from under the caps F. When, however, it becomes necessary to remove the cutters for grinding or for any other purpose, the cutter-bar is first detached from the connecting-rod and slid along far enough so that the sweep of the cutters shall bring it out from under the caps F, which movement allows the bar E to be raised and taken away, which leaves the heels of the cutters free. They are kept down upon the pins $a$ by a lip or backward projection, $f$, which covers the forward end of the cutter, but from which the cutter may be released by turning the heel of it forward so as to bring the side of the cutter toward the lip $f$, when it may be raised up off the pin and removed. These cutters cut against short curved teeth G, attached to the finger-bar for that purpose, between the guard-fingers B. The cutting portion of the cutters is also hollowed, as shown, so as to make the same or nearly the same angle of intersection in one part of the stroke that they will in another.

I am aware that cutters have been so hung as to vibrate upon an axis back of the cutting portion, and the edges made in a convex form to give a more constant angle of intersection; but this arrangement is open to the objection that while the angle at the point of intersection may be very acute, the angle forward of that point must necessarily be less so, and will consequently have a tendency to push the grass away from the cutting-point. In my machine the reverse is the case. The longitudinal lines of the edges are concave instead of convex, which gives a less angle forward of the cutting-point than at it, and as a consequence less tendency to push the grass away from the cut than the old arrangement. The cutters are hollowed or cut away forward of the cutting portion. The grass is cut at each stroke fully up to the points of the teeth G, they having very little, if any, tendency to throw the grass down; and, even if their points projected a short distance forward of the cutter, they would not have the same injurious effect in that respect that they would have if they came forward even with the points of the guard-teeth, to which the cutters are attached, and a less broken front was opposed to the entrance of the grass.

The particular improvements which constitute my said invention, and which I claim as having been originally and first invented by me, are—

1. The mode described of attaching the cutters to the guard-teeth and to the cutter-bar, in combination with the shortened lip $b$, by which I am enabled to readily detach said cutters for grinding or for other purposes, as set forth.

2. A hollowed cutter so arranged in connection with other parts as to present the same or nearly the same cutting angle in every part of the stroke when the teeth are hinged to their axes $a$ forward of the cutting parts, as set forth.

CHESTER BULLOCK.

Witnesses:
 EDM. F. BROWN,
 THOS. P. HOW.